US009035209B2

(12) United States Patent
Tsuduki

(10) Patent No.: US 9,035,209 B2
(45) Date of Patent: May 19, 2015

(54) MOVABLE CONTACT AND CONTACT STRUCTURE INCLUDING THE SAME

(71) Applicant: HOSIDEN CORPORATION, Yao-shi, Osaka (JP)

(72) Inventor: Shiro Tsuduki, Yao (JP)

(73) Assignee: HOSIDEN CORPORATION, Yao-shi (JP)

( * ) Notice: Subject to any disclaimer, the term of this patent is extended or adjusted under 35 U.S.C. 154(b) by 177 days.

(21) Appl. No.: 13/687,215

(22) Filed: Nov. 28, 2012

(65) Prior Publication Data

US 2013/0134030 A1      May 30, 2013

(30) Foreign Application Priority Data

Nov. 29, 2011    (JP) ................................. 2011-259768

(51) Int. Cl.
| | |
|---|---|
| *H01H 19/20* | (2006.01) |
| *H01H 19/10* | (2006.01) |
| *H01H 1/36* | (2006.01) |
| *H01H 19/00* | (2006.01) |
| *H01H 1/44* | (2006.01) |
| *H01H 19/58* | (2006.01) |
| *G01D 5/165* | (2006.01) |

(52) U.S. Cl.
CPC ................. *H01H 19/10* (2013.01); *H01H 1/36* (2013.01); *H01H 1/44* (2013.01); *H01H 19/005* (2013.01); *H01H 19/58* (2013.01); *G01D 5/1655* (2013.01)

(58) Field of Classification Search
USPC ................................... 200/571, 564; 338/162
See application file for complete search history.

(56) References Cited

U.S. PATENT DOCUMENTS

| | | | | |
|---|---|---|---|---|
| 4,112,274 A | * | 9/1978 | Pigman et al. ...................... 218/8 |
| 4,390,757 A | * | 6/1983 | Wiessner ..................... 200/11 G |
| 4,728,755 A | * | 3/1988 | Fowler et al. ............. 200/11 DA |
| 5,298,698 A | * | 3/1994 | Iida et al. ................. 200/11 DA |
| 6,388,211 B1 | * | 5/2002 | Nomura et al. ........... 200/11 DA |
| 6,674,183 B1 | * | 1/2004 | Noda et al. ................ 307/132 E |
| 6,856,261 B2 | * | 2/2005 | Yoritsune et al. ............... 341/16 |
| 7,030,326 B2 | * | 4/2006 | Wilsser ......................... 200/16 A |
| 7,042,329 B2 | * | 5/2006 | Nishikori ....................... 338/162 |
| 7,105,755 B2 | * | 9/2006 | Imamura .................. 200/11 DA |
| 7,476,822 B2 | * | 1/2009 | Miura et al. .................... 200/564 |

FOREIGN PATENT DOCUMENTS

| | | |
|---|---|---|
| DE | 19847429 | 5/2000 |
| FR | 2884961 | 10/2006 |
| FR | 2933530 | 1/2010 |
| JP | 2001-148219 A1 | 5/2001 |

(Continued)

OTHER PUBLICATIONS

Extended European Search Report mailed Apr. 19, 2013 in counterpart application No. 12250169.5 (7 pages).

(Continued)

*Primary Examiner* — Kyung Lee
(74) *Attorney, Agent, or Firm* — Kratz, Quintos & Hanson, LLP

(57) ABSTRACT

The invention provides a movable contact movable on a fixed contact or a resistor. The movable contact includes first and second sliders. The first and second sliders are arranged in such a manner as to slide along different sliding tracks from each other on the fixed contact or the resistor in accordance with movement of the movable contact.

21 Claims, 4 Drawing Sheets

(56) References Cited

FOREIGN PATENT DOCUMENTS

| | | |
|---|---|---|
| JP | 2004-95242 | 3/2004 |
| JP | 2005-172596 | 6/2005 |
| JP | 2011-142014 | 7/2011 |

OTHER PUBLICATIONS

Notification of Reasons for Refusal mailed on Mar. 3, 2015 for counterpart Japanese application No. 2011-259768 with English translation.

* cited by examiner

MOVABLE CONTACT AND CONTACT STRUCTURE INCLUDING THE SAME

The present application claims priority under 35 U.S.C. §119 of Japanese Patent Application No. 2011-259768 filed on Nov. 29, 2011, the disclosure of which is expressly incorporated by reference herein in its entity.

BACKGROUND OF THE INVENTION

1. Technical Field

The present invention relates to a movable contact and a contact structure provided with the same.

2. Background Art

JP 2001-148219 A discloses a conventional contact structure that constitutes rotation detecting means for detecting rotation of an operating member used in an input device. The contact structure includes a movable contact rotatable in accordance with the rotation of the operating member and a plurality of fixed contacts annularly arranged with spacing. The movable contact has three sliders that can selectively slide on the fixed contacts in accordance with rotation of the movable contact.

SUMMARY OF INVENTION

All the sliders of the above movable contact are arranged in such a manner as to slide along the same sliding track on the fixed contacts. As a result, the fixed contacts are apt to be readily abraded.

The present invention has been devised in view of the above-described circumstances. The invention provides a movable contact capable of reducing abrasion of a fixed contact or a resistor, and also provides a contact structure including the same.

A movable contact of an aspect of the invention is movable on a fixed contact or a resistor. The movable contact includes first and second sliders. The first and second sliders are arranged in such a manner as to slide along different sliding tracks from each other on the fixed contact or the resistor in accordance with movement of the movable contact.

In this aspect of the invention, the first and second sliders are arranged in such a manner as to slide along different sliding tracks from each other on the fixed contact or the resistor in accordance with movement of the movable contact. Therefore, this aspect of the invention makes it possible to reduce abrasion of the fixed contact or the resistor in comparison with a case where the first and second sliders slide along the same sliding track on the fixed contact or the resistor.

The first slider may include two first legs adjacent to each other. The second slider may include two second legs adjacent to each other. The first and second legs may be arranged such that the sliding track of one of the first legs is positioned between the sliding tracks of the second legs and that the sliding track of one of the second legs is positioned between the sliding tracks of the first legs.

In this aspect of the invention, the first and second legs of the first and second sliders may be arranged such that the sliding track of one of the first legs is positioned between the sliding tracks of the second legs whereas the sliding track of one of the second legs is positioned between the sliding tracks of the first legs. In other words, the first and second sliders are arranged such that the traveling route of the first slider partially overlaps that of the second slider. Therefore, this aspect of the invention makes it possible to reduce the width dimension of the movable contact in comparison with a case where there is no overlap between the traveling routes of the first and second sliders.

The movable contact may further include a base. The base may be provided with first and second sliders in such a manner as to slide along the different sliding tracks from each other on the fixed contact or the resistor. Alternatively, the base may be provided with first and second arms, the first arm may be provided with the first slider, and the second arm may be provided with the second slider. In this case, the first and second arms may extend from the base such that the first and second sliders are slidable along the different sliding tracks from each other on the fixed contact or the resistor.

In a case where the movable contact is rotatable on the fixed contact or the resistor, the sliding tracks of the first and second sliders may be annular.

A first contact structure of the invention may include a movable contact of any mode as described above and a fixed contact or a resistor. The first and second sliders of the movable contact may be slidable along different sliding tracks from each other on the fixed contact or the resistor in accordance with movement of the movable contact.

A second contact structure of the invention may include a plurality of first fixed contacts annularly arranged with spacing; and a movable contact being rotatable on the fixed contacts. The movable contact may include first and second sliders. The first and second sliders may be arranged in such a manner as to slide along different sliding tracks from each other on the fixed contacts in accordance with rotation of the movable contact.

The movable contact may further include third and fourth sliders slidable on the first fixed contacts in accordance with the rotation of the movable contact. The first fixed contacts may include a plurality of first signal contacts, a plurality of second signal contacts, and a plurality of common contacts annularly arranged with spacing. When one of the first, second, third, and fourth sliders contacts one of the first signal contacts, another one of the first, second, third, and fourth sliders may contact one of the common contacts. When one of the first, second, third, and fourth sliders contacts one of the second signal contacts, another one of the first, second, third, and fourth sliders may contact one of the common contacts.

In this aspect of the present invention, the four sliders selectively contact the first and second signal contacts and the common contacts. Therefore, it is possible to reduce the number of first and second signal contacts and common contacts in comparison with a case where three or less sliders selectively contact the first and second signal contacts and the common contacts.

The second contact structure may further include a second fixed contact, a lead wire, and a cover. The second fixed contact may be disposed inside the first fixed contacts. The lead wire may extend from the second fixed contact to the outside of the first fixed contacts and crossing the sliding tracks of the first and second sliders of the movable contact. The cover may be adapted to cover at least portions of the lead wire that cross the sliding tracks.

In this aspect of the present invention, as the cover covers the portions of the lead wire that cross the sliding tracks, it is possible to dispose the first fixed contact, the second fixed contact disposed inside the first fixed contact, and the lead wire on the same face of a circuit board. Thus, this aspect of the present invention can reduce the cost of a device provided with the second contact structure.

DESCRIPTION OF EMBODIMENTS

A description will be given below of a contact structure according to a first preferred embodiment of the present invention, with reference to FIGS. 1A to 4B.

First Preferred Embodiment

Figure 1A:
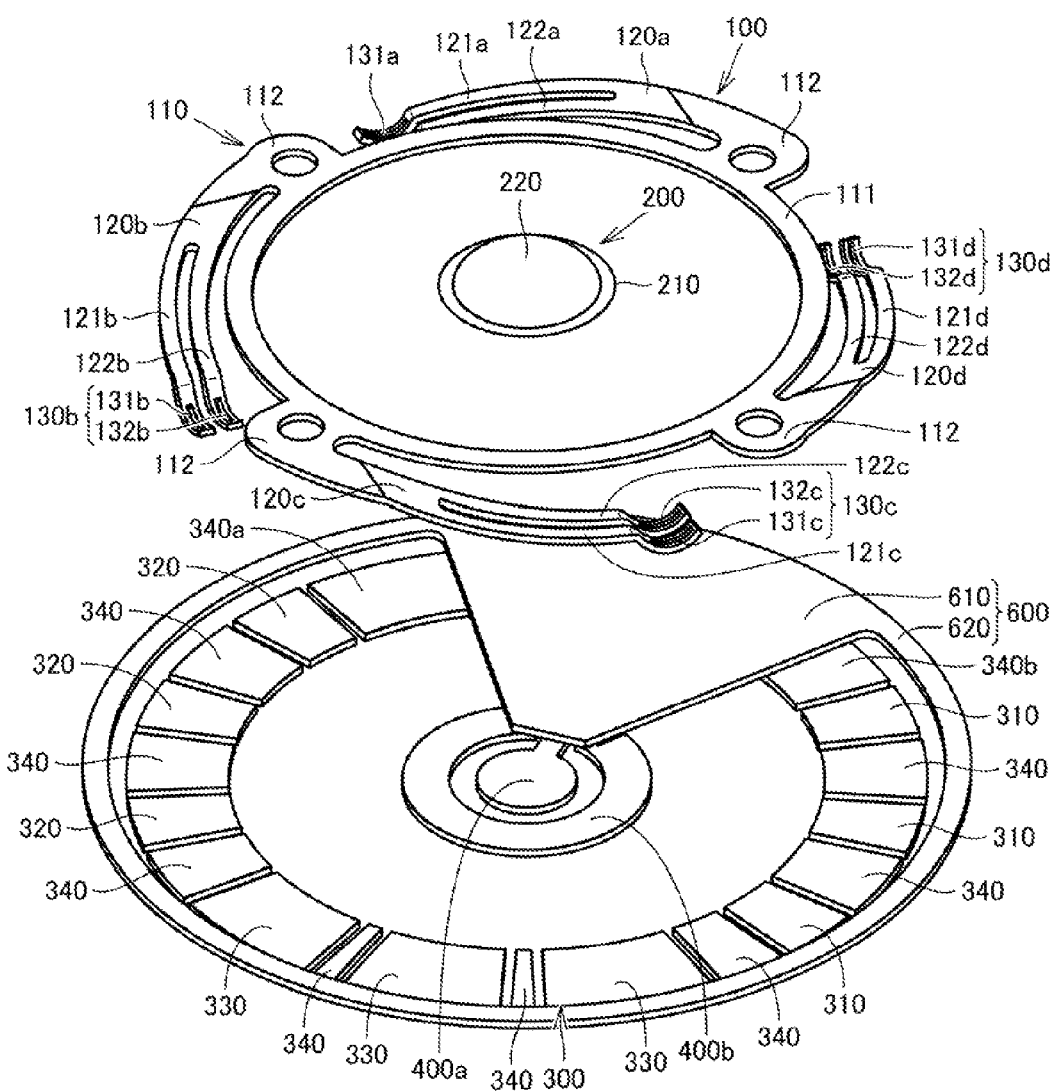
FIG. 1A is an exploded front, top, and right perspective view schematically illustrating a contact structure according to a first preferred embodiment of the present invention.
Figure 1B:
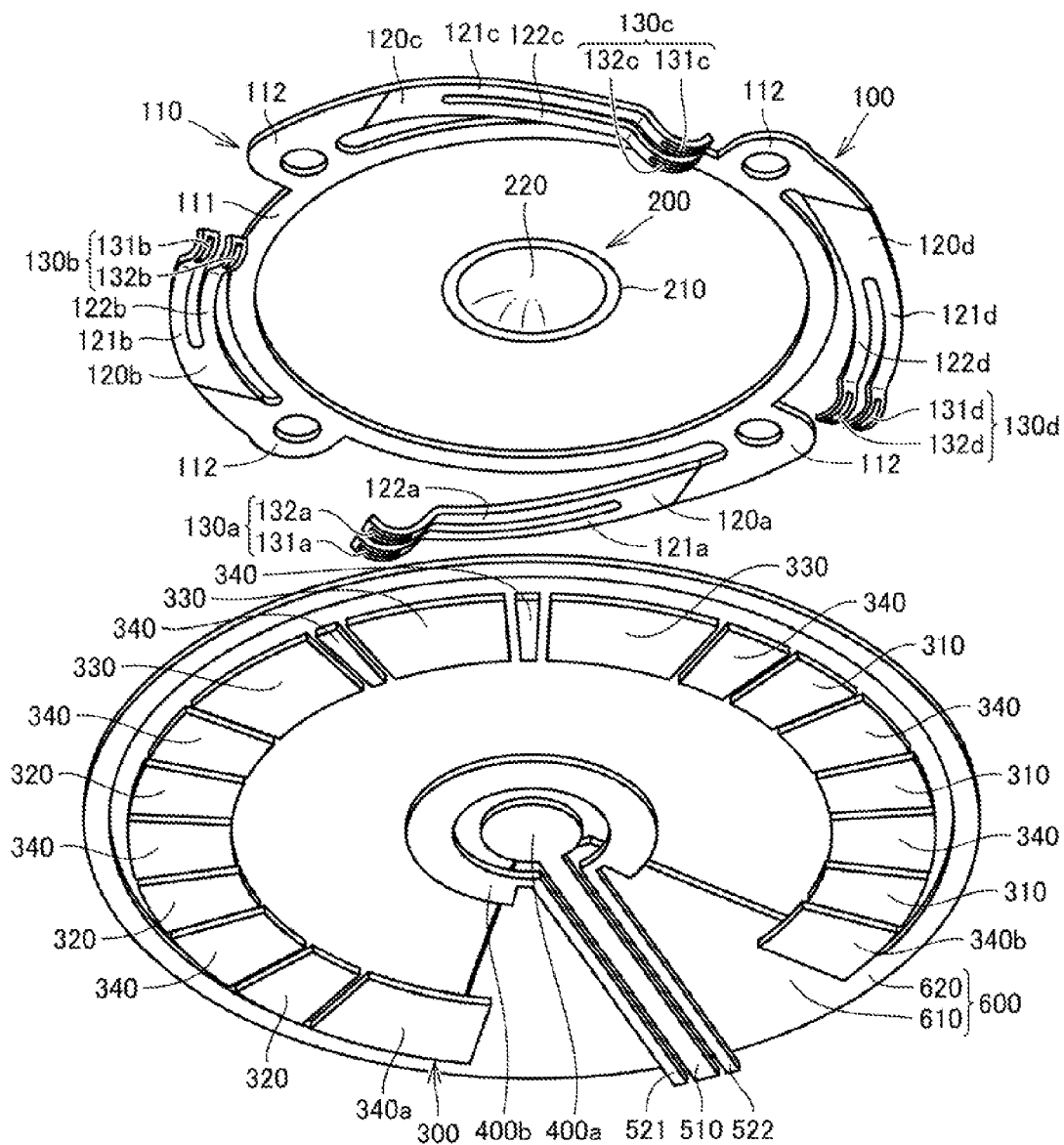
FIG. 1B is an exploded front, bottom, and right perspective view schematically illustrating the contact structure according to the first preferred embodiment of the present invention.

A contact structure shown in FIGS. 1A and 1B is used for detecting input of rotating and depressing operation in an input device (not shown). The contact structure includes a first movable contact 100 (a movable contact recited in the Claims), a second movable contact 200, a plurality of first fixed contacts 300, second fixed contacts 400a and 400b, lead wires 510, 521, and 522, and a cover 600. The first movable contact 100 and the first fixed contacts 300 constitute rotation detecting means for detecting input of rotating operation of a ring-like dial in the input device. The second movable contact 200 and the second fixed contacts 400a and 400b constitute depression detecting means for detecting input of a depressing operation of a pushbutton disposed inside the dial in the input device. The first fixed contacts 300, the second fixed contacts 400a and 400b, the lead wires 510, 521, and 522, and the cover 600 are formed on a first face of a circuit board of the input device. The first movable contact 100 is disposed on the first face of the circuit board so as to rotate on the first fixed contacts 300. The second movable contact 200 is mounted on the second fixed contact 400b on the first face of the circuit board. These constituent elements of the contact structure will be described in detail below.

Figure 2:
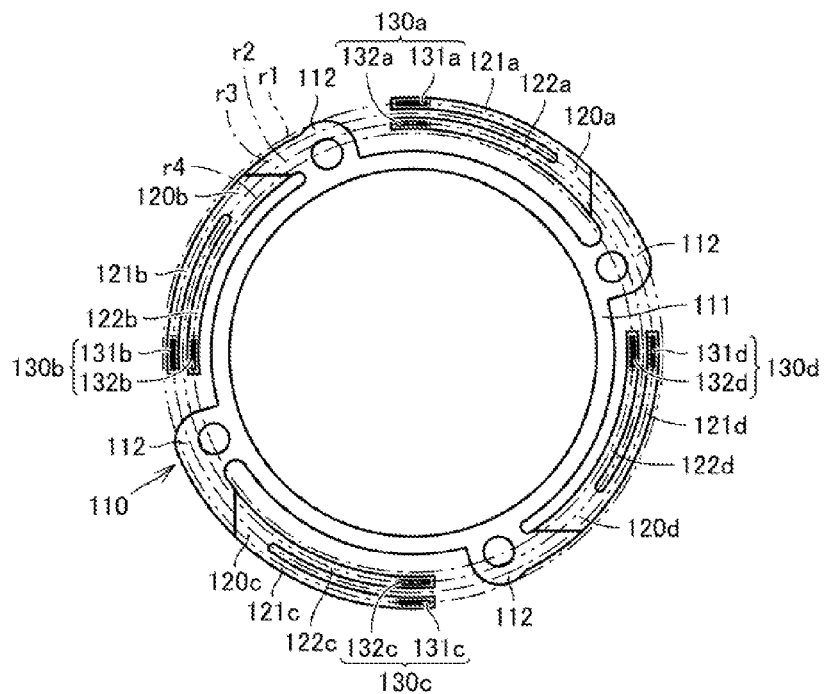
FIG. 2 is a schematic plan view of a first movable contact of the contact structure.

The first movable contact 100 is a ring-like metallic plate having electric conductivity. As shown in FIGS. 1A, 1B, and 2, the first movable contact 100 includes a base 110, arms 120a, 120b, 120c, and 120d (first, second, third, and fourth arms), and sliders 130a, 130b, 130c, and 130d (first, second, third, and fourth sliders). The base 110 is a plate including an annular ring 111 and four annular fixable portions 112. The fixable portions 112 are laid out at a pitch of 90° along the outer periphery of the ring 111. The fixable portions 112 can be fixed directly or indirectly to the dial of the input device. Fixing the fixable portions 112 of the base 110 to the dial allows the first movable contact 100 to rotate in a circumferential direction along the first fixed contacts 300 in accordance with the rotation of the dial.

The arm 120a is an arcuate plate continuously connected to one of the fixable portions 112 of the base 110, and it slopes in the axial direction of the ring 111 (i.e., toward the first fixed contacts 300). The arm 120a is bifurcated into tips 121a and 122a. The arm 120c has the same shape as the arm 120a. The arms 120b and 120d have slightly different shapes from the arms 120a and 120c, as detailed below. As shown in FIG. 2, the arm 120b is bifurcated into tips 121b and 122b, the arm 120c is bifurcated into tips 121c and 122c, and the arm 120d is bifurcated into tips 121d and 122d.

The slider 130a has legs 131a and 132a (first legs) that are continuously connected to the tips 121a and 122a of the arm 120a to extend adjacent to each other in the radial direction of the ring 111. The legs 131a and 132a are plates of semi-arcuate shape projecting in the axial direction of the ring 111 (toward the first fixed contacts 300). The sliders 130b, 130c, and 130d have the same shape as that of the slider 130a. FIG. 2 also illustrate legs 131b and 132b of the slider 130b (second legs); legs 131c and 132c of the slider 130c (third legs); and legs 131d and 132d of the slider 130d (fourth legs). The legs 131a, 132a, 131b, 132b, 131c, 132c, 131d, and 132d can slide in the circumferential direction (hereinafter referred to as the "slide direction") on the first fixed contacts 300 on the first face of the circuit board in accordance with the rotation of the first movable contact 100.

It should be appreciated that the legs 131a and 132a sliding on the first fixed contacts 300 on the first face of the circuit board form annular sliding tracks r1 and r2, respectively. Similarly, the legs 131b and 132b sliding on the first fixed contacts 300 on the first face of the circuit board form annular sliding tracks r3 and r4, respectively. The sliding tracks r1, r2, r3 and r4 are illustrated as broken lines in FIG. 2. The legs 131c and 132c form the same sliding tracks r1 and r2 as the legs 131a and 132a (the sliding tracks of the sliders 130a and 130c). The legs 131d and 132d form the same sliding tracks r3 and r4 as the legs 131b and 132b (the sliding tracks of the sliders 130b and 130d). In other words, the sliders 130a and 130c follow the same sliding tracks, and the sliders 130b and 130d follow the same sliding tracks.

The arms 120a, 120b, 120c, and 120d extend from the base 110 such that the sliding tracks r1 and r2 of the sliders 130a and 130c do not overlap the sliding tracks r3 and r4 of the sliders 130b and 130d. Specifically, the arms 120a and 120c extend outwardly of the arms 120b and 120d in the radial direction, so that the sliding track r2 is positioned between the sliding tracks r3 and r4 while the sliding track r3 is positioned between the sliding tracks r1 and r2. For this reason the arms 120a and 120c are of different shape from the arms 120b and 120d.

As shown in FIGS. 1A and 1B, the second movable contact 200 is a metallic domed plate having electric conductivity. The second movable contact 200 includes a peripheral edge 210 and a top 220. The peripheral edge 210 is mounted on the second fixed contact 400b. The top 220 is disposed under the pushbutton of the input device to face the second fixed contact 400a. When the pushbutton presses the top 220 of the second movable contact 200, the second movable contact 200 is elastically deformed (i.e., reversed) toward the second fixed contact 400a and brought into contact with the second fixed contact 400a.

Figure 3:
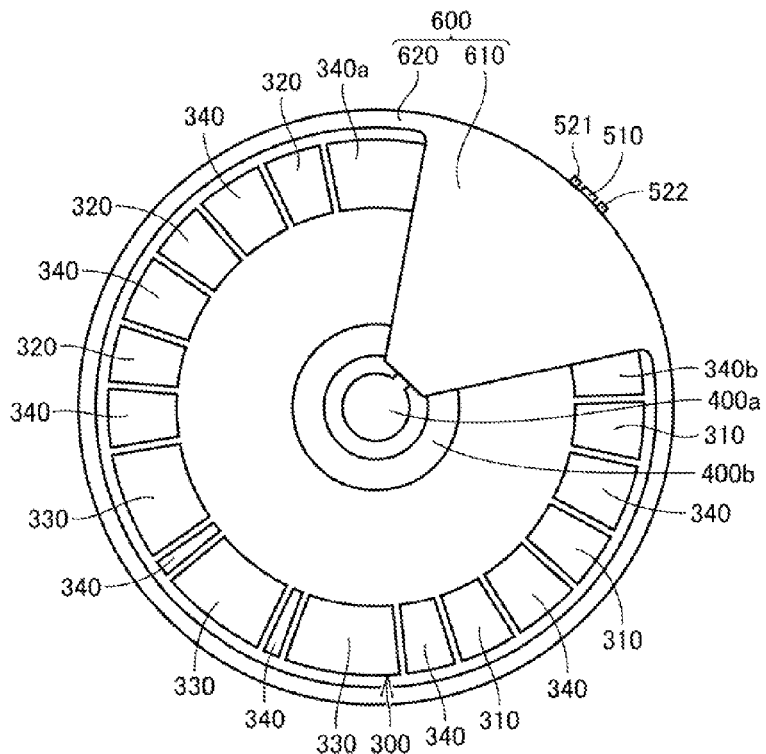
FIG. 3 is a schematic plan view of first and second fixed contacts and a cover of the contact structure.

As shown in FIG. 3, the first fixed contacts 300 consists of three first signal contacts 310, three second signal contacts 320, three common contacts 330, and a plurality of dummy contacts 340 (including 340a and 340b). The first and second signal contacts 310 and 320, the common contacts 330, and the dummy contacts 340 are conductors annularly arranged with spacing along the sliding tracks r1 to r4 of the first face of the circuit board in the input device. The first and second signal contacts, the common contacts, and the dummy contacts are arranged counterclockwise in FIG. 3 in the order of 340a, 320, 340, 320, 340, 320, 340, 330, 340, 330, 340, 330, 340, 310, 340, 310, 340, 310, and 340b.

The first and second signal contacts 310 and 320 are connected to first lead wires (not shown), which are formed on the first face of the circuit board, on a second face opposite to the first face, and/or inside the circuit board. The first lead wires are connected to a control section in the input device. The common contacts 330 are connected to second lead wires (not shown), which are formed on the first and/or second faces and/or inside the circuit board. The second lead wires are grounded. The dummy contacts 340 (including 340a and 340b) are independent (i.e., connected to nothing). There is clearance left between the dummy contacts 340a and 340b.

A predetermined voltage is applied to the first and second signal contacts 310 and 320. When the first movable contact 100 rotates through the application of voltage to the first and second signal contacts 310 and 320, one of the sliders 130a, 130b, 130c, and 130d is brought into contact with one of the first signal contacts 310, while another one of the sliders 130a, 130b, 130c, and 130d is brought into contact with one of the common contacts 330. Consequently, a first pulse signal is outputted through the first lead wire connected to the contacted first signal contact 310. When one of the sliders 130a, 130b, 130c, and 130d is brought into contact with one of the second signal contacts 320, anther one of the sliders 130a, 130b, 130c, and 130d is brought into contact with one of the common contacts 330. Consequently, a second pulse signal is outputted through the second lead wire connected to the contacted second signal contact 320. The first and second signal contacts 310, 320 are arranged such that the phase of the first pulse signal is shifted from that of the second pulse signal. The control section can detect the rotational direction of the dial of the input device based on which of the first and second pulse signals is first inputted into the control section of the input device. Moreover, the control section counts the first and second pulse signals to detect the rotational amount (i.e., the rotational angle) of the dial. This is the mechanism how the first movable contact 100 and the first fixed contacts 300 function as the rotation detecting means for detecting the input of rotating operation in the input device.

As shown in FIG. 3, the second fixed contact 400a is a circular conductor disposed inside the first fixed contacts 300 on the first face of the circuit board. The second fixed contact 400b is a generally C-shaped conductor disposed concentrically with the second fixed contact 400a on the first face of the circuit board. The lead wire 510 is provided on the first face of the circuit board and connected to the second fixed contact 400a. The lead wire 510 extends from the second fixed contact 400a to the outside of the first fixed contacts 300 (i.e., to the outside of a virtual circle along the rim of the annually arranged first fixed contacts 300) through between the dummy contact 340a and the dummy contact 340b. The lead wires 521 and 522 are disposed on the first face of the circuit board to be connected to two ends of the second fixed contact 400b. The lead wires 521 and 522 extend from the second fixed contact 400b to the outside of the virtual circle through between the dummy contact 340a and the dummy contact 340b. In other words, the lead wires 510, 521, and 522 cross the sliding tracks r1 to r4. The lead wire 510 is connected to the control section of the input device, while the other lead wires 521 and 522 are grounded. When the top 220 of the second movable contact 200 contacts the second fixed contact 400a, electrical continuity is established between the second fixed contacts 400a and 400b to output a signal. The signal travels through the lead wire 510 to be received by the control section as indicating the input of the depressing operation of the depression button in the input device. This is the mechanism how the second movable contact 200 and the second fixed contacts 400a and 400b function as the depression detecting means for detecting the input of depressing operation in the input device.

As shown in FIG. 3, the cover 600 is an insulator or a resist provided on the first face of the circuit board. The cover 600 includes a fan-shaped cover body 610 and a ring-shaped annular portion 620. The cover body 610 covers the lead wires 510, 521, and 522 from the vicinity of the second fixed contact 400a to the outside of the virtual circle. In other words, the cover body 610 covers the portions of the lead wires 510, 521, and 522 that cross the sliding tracks r1 to r4. The cover body 610 also covers inner portions of the dummy contacts 340a and 340b. The annular portion 620 is continuous with the outer edge of the cover body 610 and is disposed concentrically and outside of the virtual circle of the first fixed contacts 300.

Figure 4A:
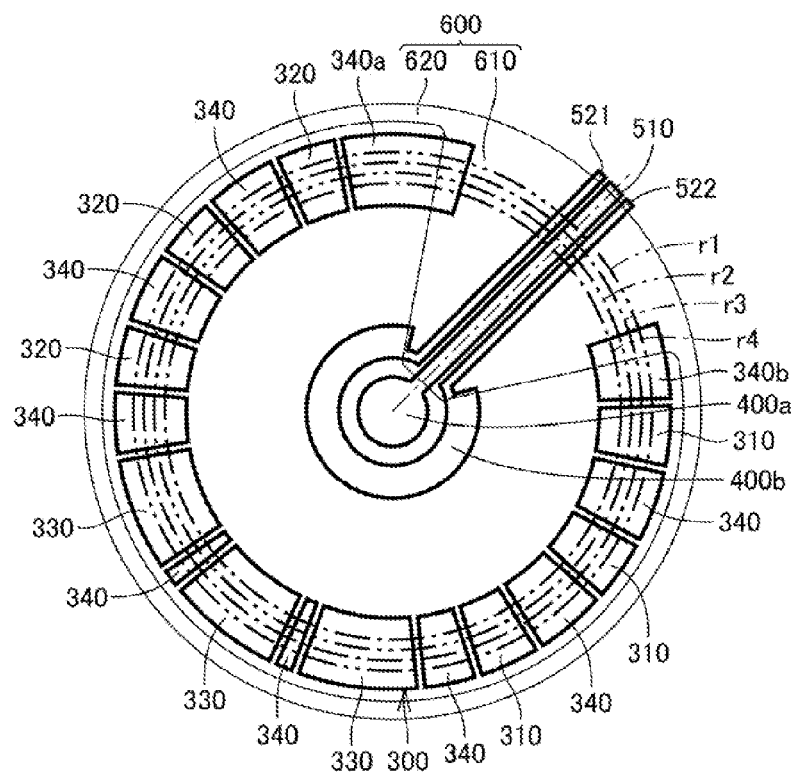
FIG. 4A is a schematic plan view of the first and second fixed contacts and the cover of the contact structure, illustrating the cover as transparent and sliding tracks of sliders of the first movable contact.
Figure 4B:
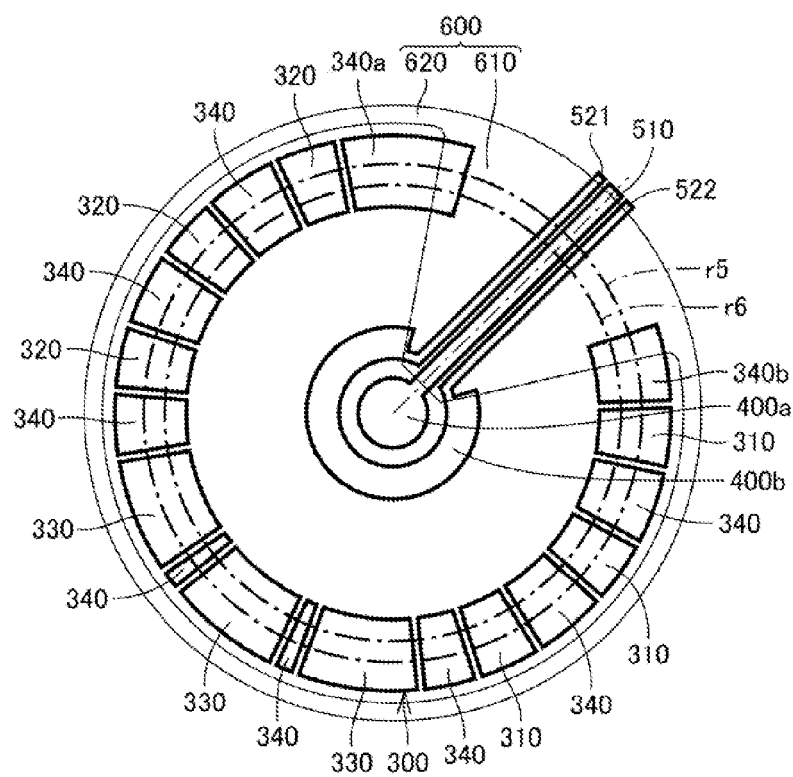
FIG. 4B is a schematic plan view of first and second fixed contacts and a cover of the contact structure, illustrating the cover as transparent and sliding tracks of sliders of a movable contact of a comparative example.

The above-described contact structure has many technical features. First, the legs of the sliders 130a and 130c of the first movable contact 100 slide along the sliding tracks r1 and r2 on the first fixed contacts 300, and the legs of the sliders 130b and 130d slide along the sliding tracks r3 and r4 on the first fixed contacts 300, as shown in FIG. 4A. FIG. 4B shows a comparison example where the legs of four sliders slide along the same sliding tracks r5 and r6 on the first fixed contacts 300. Compared to this comparison example, the abrasion of the first fixed contacts 300 as shown FIG. 4A should be reduced, substantially to half.

Second, the sliders 130a, 130b, 130c, and 130d are arranged such that the sliding track r2 of the legs 132a and 132c is positioned between the sliding track r3 of the legs 131b and 131d and the sliding track r4 of the legs 132b and 132d, and the sliding track r3 of the legs 131b and 131d is positioned between the sliding track r1 of the legs 131a and 131c and the sliding track r2 of the legs 132a and 132c. In other words, the sliders 130a and 130c and the sliders 130b and 130d are arranged such that the traveling route of the sliders 130a and 130c partially overlaps that of the sliders 130b and 130d. It is thus possible to reduce the radial dimension of the first movable contact 100 in comparison with a case where there is no overlap between the traveling route of the sliders 130a and 130c and that of the sliders 130b and 130d. As a consequence, it is possible to reduce the radial dimension of the input device provided with the first movable contact 100.

Third, the four sliders 130a, 130b, 130c, and 130d are adapted to selectively contact the first and second signal contacts 310 and 320 and the common contacts 330 so as to output the first and second pulse signals. It is thus possible to reduce the number of first, second signal and common contacts, in comparison with a case where the three or less sliders selectively contact the first and second signal contacts and the common contacts. More particularly, given that the number of pulses of the first and second pulse signals is twelve and the movable contact has three sliders, then the required number of first, second signal and common contacts will be four. This is in contrast with the present contact structure with the first movable contact 100 including four sliders, then the required number of first and second signal contacts 310 and 320 and common contacts 330 is three. By thus reducing the number of first and second signal contacts 310 and 320 and common contacts 330, it is possible to reduce the cost of the input device. Further advantageously, with the reduced number of first and second signal contacts 310 and 320 and common contacts 330, the lead wires 510, 521, and 522 can be readily lead out to the outside of the first fixed contacts 300 through between the adjacent two first fixed contacts 300.

It should be appreciated that the above-described contact structure and the first movable contact 100 are not limited to the configurations of the above-described first preferred embodiment. They may be modified in design within the scope of the claims as described below in detail.

In the first preferred embodiment, the first movable contact 100 is a ring-like metallic plate adapted to rotate in the circumferential direction on the first fixed contacts 300. However, the first movable contact of the invention may be any movable contact adapted to move on the fixed contact or the resistor. For example, a first movable contact may move straight on and along a straight fixed contact or resistor. Alternatively, a first movable contact may rotate on a ring-like resistor.

In the first preferred embodiment, the first movable contact 100 includes the base 110, the arms 120a, 120b, 120c, and 120d, and the sliders 130a, 130b, 130c, and 130d. However, the first movable contact of the invention may be modified in any manner as long as it is provided with first and second sliders arranged in such a manner as to slide on a fixed contact or a resistor, along different sliding tracks from each other in accordance with the movement of the movable contact. For example, a first movable contact may be provided with a base and first and second sliders on the base arranged in such a manner as to slide along different sliding tracks from each other on a fixed contact or a resistor.

In the first preferred embodiment, the sliders 130a and 130b (the first and second sliders) follow the sliding tracks of annular shape. However, the sliding tracks of the first and second sliders of the invention are not limited to these. For example, when a first movable contact is adapted for straight movement along a straight fixed contact or resistor, the sliding tracks of first and second sliders should be straight.

In the first preferred embodiment, the slider 130a (the first slider) has the legs 131a and 132a, and the slider 130b (the second slider) has the legs 131b and 132b. The first and second sliders of the invention may be modified in any manner as long as they are slidable along different sliding tracks from each other on a fixed contact or a resistor. For example, each of the first and second sliders may have a single leg or three or more legs. Similarly, where the first movable contact is adapted to move straight on a straight fixed contact resistor, each of the first and second sliders may also have a single leg, two legs as in first preferred embodiment, or three or more legs.

In the first preferred embodiment, the sliders 130a and 130c follow the same the sliding tracks and the sliders 130b and 130d follow the same the sliding tracks However, the first, second, third, and fourth sliders of the invention may be arranged such that they all follow different sliding tracks.

In the first preferred embodiment, the arms 120a and 120b (the first and second arms) are arcuate plates continuously connected to the fixable portions 112 of the base 110 and it slopes in the axial direction of the ring 111 (toward the first fixed contacts 300). However, the first and second arms of the invention may be modified in any manner as long as the first and second sliders are slidable along different sliding tracks from each other on a fixed contact or a resistor in accordance with movement of the movable contact.

In the first preferred embodiment, the base 110 includes the ring 111 and the four fixable portions 112. However, the base of the invention may be modified as long as it is adapted for provision of first and second arms or first and second sliders. For example, first and second arms or first and second sliders may be provided in a disk-like base. Also, the base may or may not be plate like, and it may also be evaporately deposited conductor on the dial or the like.

In the first preferred embodiment, the first fixed contacts 300 consist of the three first signal contacts 310, the three second signal contacts 320, the three common contacts 330, and the dummy contacts 340 (including the dummy contacts 340a and 340b). However, the first fixed contacts of the invention may be conductors of any kind allowing the first and second sliders to slide along different sliding tracks in accordance with the movement of the first movable contact. Furthermore, there may be three each of the first signal contacts 310, the second signal contacts 320, and the common contacts 330 as in the first preferred embodiment. Alternatively, there may be provided any number each of the first signal contacts, the second signal contacts, and the common contacts. In addition, the dummy contacts 340 may be omitted.

In the first preferred embodiment, the contact structure is provided with the second movable contact 200, the second fixed contacts 400a and 400b, the lead wires 510, 521, and 522, and the cover 600. However, the contact structure of the present invention may not include any one of the second movable contact, the second fixed contacts, the lead wires, and the cover.

The contact structure of the first preferred embodiment includes the depression detecting means for detecting the input of depressing operation in the input device constituted by the second movable contact 200 and the second fixed contacts 400a and 400b. Alternatively, the contact structure of the invention may be adapted for use with any other electronic device, in which case the second movable contact 200 may be omitted and the electronic device may be connected to the second fixed contacts 400a and 400b. The electronic device may be an light-emitting diode (LED), a line sensor for fingerprint authentication, a microphone, a proximity switch, or the like. The proximity switch may include a magnetic sensor for detecting changes in magnetic field in accordance with movement of a magnet fixed to the depression button, an electrostatic sensor for detecting changes in electrostatic capacity between a metallic plate and the sensor in accordance with movement of the metallic plate fixed to the depression button, or an optical sensor such as a photointerruptor. Moreover, at least one second fixed contact will suffice. In a contact structure with a single second fixed contact, the second movable contact 200 or the electronic device as described above may be grounded using another connecting means such as a cable or a pin.

The contact structure of the first preferred embodiment includes the lead wires 521 and 522 connected to the second fixed contact 400b. However, the lead wires 521 and 522 may be omitted. If omitted, the second fixed contact 400b may be connected to a common contact of the first fixed contacts. The lead wires 510, 521, and 522 are mounted on the first face of the circuit board in the first preferred embodiment, but the lead wires 510, 521, and 522 may be provided on and/or inside the first and second faces of a board. Additionally, the lead wires may extend from a second fixed contact to the outside of the first fixed contacts through between the dummy contact 340a and the dummy contact 340b, or through between any other adjacent two of the first fixed contacts.

The second movable contact 200 in the first preferred embodiment is a domed metallic plate having the electric conductivity. However, the second movable contact of the invention may be modified as long as it is faces a second fixed contact and is adapted to elastically deform or move toward the second fixed contact so as to contact the second fixed contact. For example, the second movable contact may be an electrically conductive plate having a semi-arcuate cross section.

The cover 600 in the first preferred embodiment includes the cover body 610 and the annular portion 620. The cover of the invention may be of any other kind adapted to cover at least portions of the lead wires connected to the second fixed contact, the portions crossing the sliding tracks of the first and second sliders.

It should be appreciated that the above-described preferred embodiment and modification examples are described by way of examples only. The material, shape, dimensions, number, arrangement, and other features of each constituent element of the contact structure and the first movable contact may be modified as long as the same functions. The contact structure and the first movable contact of the invention may be used as detecting means for an input device or may be used for other purposes.

REFERENCE SIGNS LIST 100 first movable contact (movable contact in the claims
110 base
111 ring
112 fixable portions
120a arm (first arm)
120b arm (second arm)
120c arm (third arm)
120d arm (fourth arm)
130a slider (first slider)
131a leg (first leg)
132a leg (first leg)
130b slider (second slider)
131b leg (second leg)
132b leg (second leg)
130c slider (third slider)
131c leg (third leg)
132c leg (third leg)
130d slider (fourth slider)
131d leg (fourth leg)
132d leg (fourth leg)
200 second movable contact
300 first fixed contact
310 first signal contact
320 second signal contact
330 common contact
340 dummy contact
r1, r2 sliding track(sliding track of slider 130a, 130c)
r3, r4 sliding track(sliding track of slider 130b, 130d)
400a second fixed contact
400b second fixed contact
510 lead wire
521 lead wire
522 lead wire
600 cover
610 cover body
620 annular portion

The invention claimed is:

1. A movable contact movable on a fixed contact or a resistor, the movable contact comprising:
first and second sliders arranged in such a manner as to slide along different sliding tracks from each other on the fixed contact or the resistor in accordance with movement of the movable contact,
wherein the first slider includes a plurality of first legs, and the second slider includes a plurality of second legs, and
wherein the first legs and the second legs are arranged to slide along their own sliding tracks that are all different from each other.

2. A movable contact movable on a fixed contact or a resistor, the movable contact comprising:
first and second sliders arranged in such a manner as to slide along different sliding tracks from each other on the fixed contact or the resistor in accordance with movement of the movable contact, wherein:
the first slider includes two first legs adjacent to each other, the second slider includes two second legs adjacent to each other,
the adjacent first and second legs and the adjacent second legs are arranged such that the sliding track of one of the first legs is positioned between the sliding tracks of the second legs and that the sliding track of one of the second legs is positioned between the sliding tracks of the first legs, and
only a clearance exists between the two first legs.

3. The movable contact according to claim 1, further comprising a base, on which the first and second sliders are disposed in such a manner as to slide along the different sliding tracks from each other on the fixed contact or the resistor.

4. The movable contact according to claim 2, further comprising a base, on which the first and second sliders are disposed in such a manner as to slide along the different sliding tracks from each other on the fixed contact or the resistor.

5. The movable contact according to claim 1, further comprising:
a base; and
first and second arms provided at the base, the first arm being provided with the first slider and the second arm being provided with the second slider;
wherein the first and second arms extend from the base such that the first and second sliders are slidable along the different sliding tracks from each other on the fixed contact or the resistor.

6. The movable contact according to claim 2, further comprising:
a base; and
first and second arms provided at the base, the first arm being provided with the first slider and the second arm being provided with the second slider;
wherein the first and second arms extend from the base such that the first and second sliders are slidable along the different sliding tracks from each other on the fixed contact or the resistor.

7. The movable contact according to claim 1, wherein
the movable contact is rotatable on the fixed contact or the resistor, and
the sliding tracks of the first and second sliders are annular.

8. The movable contact according to claim 2, wherein
the movable contact is rotatable on the fixed contact or the resistor, and
the sliding tracks of the first and second sliders are annular.

9. The movable contact according to claim 3, wherein
the movable contact is rotatable on the fixed contact or the resistor, and
the sliding tracks of the first and second sliders are annular.

10. The movable contact according to claim 5, wherein
the movable contact is rotatable on the fixed contact or the resistor, and
the sliding tracks of the first and second sliders are annular.

11. A contact structure comprising:
the movable contact according to claim 1; and
a fixed contact or a resistor;
wherein the first and second sliders of the movable contact are slidable along different sliding tracks from each other on the fixed contact or the resistor in accordance with movement of the movable contact.

12. A contact structure comprising:
the movable contact according to claim 7; and
a plurality of first fixed contacts annularly arranged with spacing; wherein
   the movable contact is rotatable on the first fixed contacts; and
the first and second sliders are slidable along different sliding tracks from each other on the first fixed contacts in accordance with rotation of the movable contact.

13. A contact structure comprising:
the movable contact according to claim 8; and
a plurality of first fixed contacts annularly arranged with spacing; wherein
   the movable contact is rotatable on the first fixed contacts; and
the first and second sliders are slidable along different sliding tracks from each other on the first fixed contacts in accordance with rotation of the movable contact.

14. A contact structure comprising:
the movable contact according to claim 9; and
a plurality of first fixed contacts annularly arranged with spacing; wherein
   the movable contact is rotatable on the first fixed contacts; and
the first and second sliders are slidable along different sliding tracks from each other on the first fixed contacts in accordance with rotation of the movable contact.

15. A contact structure comprising:
the movable contact according to claim 10; and
a plurality of first fixed contacts annularly arranged with spacing; wherein
   the movable contact is rotatable on the first fixed contacts; and
the first and second sliders are slidable along different sliding tracks from each other on the first fixed contacts in accordance with rotation of the movable contact.

16. The contact structure according to claim 12, wherein
the movable contact further comprises third and fourth sliders slidable on the first fixed contacts in accordance with the rotation of the movable contact,
the first fixed contacts include a plurality of first signal contacts, a plurality of second signal contacts, and a plurality of common contacts annularly arranged with spacing;
when one of the first, second, third, and fourth sliders contacts one of the first signal contacts, another one of the first, second, third, and fourth sliders contacts one of the common contacts; and
when one of the first, second, third, and fourth sliders contacts one of the second signal contacts, another one of the first, second, third, and fourth sliders contacts one of the common contacts.

17. A contact structure comprising:
a plurality of first fixed contacts annularly arranged with spacing;
a movable contact movable on the first fixed contacts, the movable contact including first and second sliders arranged in such a manner as to slide along different annular sliding tracks from each other on the first fixed contacts in accordance with rotation of the movable contact,
a second fixed contact disposed inside the first fixed contacts;
a lead wire extending from the second fixed contact to the outside of the first fixed contacts and crossing the sliding tracks of the first and second sliders of the movable contact, and
a cover adapted to cover at least portions of the lead wire that cross the sliding tracks.

18. The contact structure according to claim 17, wherein
the first slider includes two first legs adjacent to each other,
the second slider includes two second legs adjacent to each other, and
the first and second legs are arranged such that the sliding track of one of the first legs is positioned between the sliding tracks of the second legs and that the sliding track of one of the second legs is positioned between the sliding tracks of the first legs.

19. The contact structure according to claim 17, further comprising a base, on which the first and second sliders are disposed in such a manner as to slide along the different sliding tracks from each other on the fixed contacts.

20. The movable contact according to claim 17, further comprising:
a base; and
first and second arms provided at the base, the first arm being provided with the first slider and the second arm being provided with the second slider;
wherein the first and second arms extend from the base such that the first and second sliders are slidable along the different sliding tracks from each other on the fixed contacts.

21. The movable contact according to claim 17, wherein
the movable contact further comprises third and fourth sliders slidable on the first fixed contacts in accordance with the rotation of the movable contact,
the first fixed contacts include a plurality of first signal contacts, a plurality of second signal contacts, and a plurality of common contacts annularly arranged with spacing;
when one of the first, second, third, and fourth sliders contacts one of the first signal contacts, another one of the first, second, third, and fourth sliders contacts one of the common contacts; and
when one of the first, second, third, and fourth sliders contacts one of the second signal contacts, another one of the first, second, third, and fourth sliders contacts one of the common contacts.

\* \* \* \* \*